United States Patent
Heine et al.

(10) Patent No.: US 7,235,168 B2
(45) Date of Patent: Jun. 26, 2007

(54) METHOD FOR ELECTROCHEMICALLY FORMING A HYDRODYNAMIC BEARING SURFACE

(75) Inventors: Gunter Heine, Aptos, CA (US); Klaus Dieter Kloeppel, Watsonville, CA (US); Dustin Alan Cochran, Watsonville, CA (US)

(73) Assignee: Seagate Technology. LLC, Scotts Valley, CA (US)

( * ) Notice: Subject to any disclaimer, the term of this patent is extended or adjusted under 35 U.S.C. 154(b) by 87 days.

(21) Appl. No.: 10/340,423

(22) Filed: Jan. 10, 2003

(65) Prior Publication Data

US 2003/0221973 A1    Dec. 4, 2003

Related U.S. Application Data

(60) Provisional application No. 60/383,820, filed on May 28, 2002.

(51) Int. Cl.
  *B23H 3/00* (2006.01)
  *B23H 9/00* (2006.01)
(52) U.S. Cl. .................................. 205/640
(58) Field of Classification Search ............... 205/640, 205/653, 666, 668; 384/627
  See application file for complete search history.

(56) References Cited

U.S. PATENT DOCUMENTS 3,984,911 A    10/1976  Krug et al.
4,120,544 A *  10/1978  Huber .......................... 384/292
4,332,428 A *   6/1982  Maruyama ................... 310/90.5
5,683,183 A *  11/1997  Tanaka et al. ............... 384/100
5,700,092 A *  12/1997  Wasson et al. .............. 384/115
5,793,561 A *   8/1998  Ibaraki et al. ................. 360/84
6,251,257 B1    6/2001  Cochran
6,267,869 B1    7/2001  MacLeod et al.
6,358,394 B1    3/2002  Cochran
6,544,403 B2 *  4/2003  Usui ........................... 205/666
2003/0006146 A1* 1/2003  Lee et al. ..................... 205/640

FOREIGN PATENT DOCUMENTS

EP    1 068 921 A1    1/2001
GB    2 319 741 A     6/1998
GB    2319741 A    *  6/1998
JP    2001-336532    12/2001

OTHER PUBLICATIONS

International Search Report mailed on Oct. 9,2003 for PCT patent application no. PCT/US03/16989 filed May 28, 2003. 4 pages.

* cited by examiner

*Primary Examiner*—George Wyszomierski
*Assistant Examiner*—Michael P. Alexander
(74) *Attorney, Agent, or Firm*—Morrison & Foerster LLP

(57) ABSTRACT

A method of forming a hydrodynamic bearing surface on a workpiece is provided. The method comprises electrochemically etching away all material in a region of the surface, except for portions of the region defined by a land pattern on an etching cathode. The step of removing forms a continuous recessed region comprising grooves formed between the portions of the region defined by the land pattern, and a relief cut region circumscribing the workpiece.

9 Claims, 5 Drawing Sheets

METHOD FOR ELECTROCHEMICALLY FORMING A HYDRODYNAMIC BEARING SURFACE

CROSS REFERENCE TO RELATED APPLICATIONS

This application claims the priority of U.S. Provisional Application No. 60/383,820, filed May 28, 2002 by Heine et al. (entitled "Grooving Technique For Reduced Power Consumption"), which is herein incorporated by reference.

FIELD OF THE INVENTION

The invention relates to electrochemical machining (ECM) and, more particularly, to the ECM of hydrodynamic bearing surfaces.

BACKGROUND OF THE INVENTION

Disk drives are capable of storing large amounts of digital data in a relatively small area. Disk drives store information on one or more recording media, which conventionally take the form of circular storage disks (e.g. media) having a plurality of concentric circular recording tracks. A typical disk drive has one or more disks for storing information. This information is written to and read from the disks using read/write heads mounted on actuator arms that are moved from track to track across the surfaces of the disks by an actuator mechanism.

Generally, the disks are mounted on a spindle that is turned by a spindle motor to pass the surfaces of the disks under the read/write heads. The spindle motor generally includes a shaft mounted on a base plate and a hub, to which the spindle is attached, having a sleeve into which the shaft is inserted. Permanent magnets attached to the hub interact with a stator winding on the base plate to rotate the hub relative to the shaft. In order to facilitate rotation, one or more bearings are usually disposed between the hub and the shaft.

Over the years, storage density has tended to increase, and the size of the storage system has tended to decrease. This trend has lead to greater precision and lower tolerance in the manufacturing and operating of magnetic storage disks. For example, to achieve increased storage densities, the read/write heads must be placed increasingly close to the surface of the storage disk. This proximity requires that the disk rotate substantially in a single plane. A slight wobble or run-out in disk rotation can cause the surface of the disk to contact the read/write heads. This is known as a "crash" and can damage the read/write heads and surface of the storage disk, resulting is loss of data.

From the foregoing discussion, it can be seen that the bearing assembly that supports the storage disk is of critical importance. One typical bearing assembly comprises ball bearings supported between a pair of races that allow a hub of a storage disk to rotate relative to a fixed member. However, ball bearing assemblies have many mechanical problems, such as wear, run-out and manufacturing difficulties. Moreover, resistance to operating shock and vibration is poor because of low damping.

One alternative bearing design is a hydrodynamic bearing. In a hydrodynamic bearing, a lubricating fluid such as air or liquid provides a bearing surface between a fixed member of the housing and a rotating member of the disk hub. In addition to air, typical lubricants include gas, oil, or other fluids. Hydrodynamic bearings spread the bearing surface over a large surface area, as opposed to a ball bearing assembly, which comprises a series of point interfaces. This is desirable because the increased bearing surface reduces wobble or run-out between the rotating and fixed members. Further, the use of fluid in the interface area imparts damping effects to the bearing, which helps to reduce non-repeat run-out.

Dynamic pressure-generating grooves (i.e. hydrodynamic grooves) disposed on journals, thrust, and conical hydrodynamic bearings generate a localized area of high fluid pressure and provide a transport mechanism for fluid or air so that fluid pressure is more evenly distributed within the bearing and between the rotating surfaces. The shape of the hydrodynamic grooves is dependent on the pressure uniformity desired. The quality of the fluid displacement and therefore the pressure uniformity is generally dependent upon the groove depth and dimensional uniformity. For example, a hydrodynamic groove having a non-uniform depth may lead to pressure differentials and subsequent premature hydrodynamic bearing or journal failure.

As the result of the above problems, electrochemical machining (ECM) of grooves in a hydrodynamic bearing has developed. Broadly described, ECM is a process of removing material metal without the use of mechanical or thermal energy. Basically, electrical energy is combined with a chemical to form an etching reaction to remove material from the hydrodynamic bearing, forming hydrodynamic grooves thereon. To perform the method, direct current is passed between the work piece, which serves as an anode, and the electrode, which typically carries the pattern to be formed and serves as a cathode. The current is passed through a conductive electrolyte that is between the two surfaces. At the anode surface, electrons are removed by current flow, and the metallic bonds of the molecular structure at the surface are broken. These atoms form a solution with the electrolyte, as metal ions, forming metallic hydroxides. These metallic hydroxide (MOH) molecules are carried away and filtered out from the electrolyte.

In current motor designs, "relief cuts" are machined into a work piece at one step in the machining process. These relief cuts have the effect of increasing the bearing running gap in certain areas, hence creating less friction loss by unnecessary shearing of oil. Therefore, power consumed by the bearings is reduced. However, this additional step in the machining process renders the overall process longer and therefore more costly.

Therefore, a need exists for an electrochemical machining process that reduces bearing power consumption without requiring additional cost or time during manufacturing.

SUMMARY OF THE INVENTION

The invention provides a method and apparatus for the electrochemical machining of a hydrodynamic bearing. Relief cuts are formed within the work piece simultaneously with the forming of hydrodynamic grooves, reducing the time and cost incurred by the electrochemical machining process.

BRIEF DESCRIPTION OF THE DRAWINGS

So that the manner in which the above recited embodiments of the invention are attained and can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION

Figure 1:
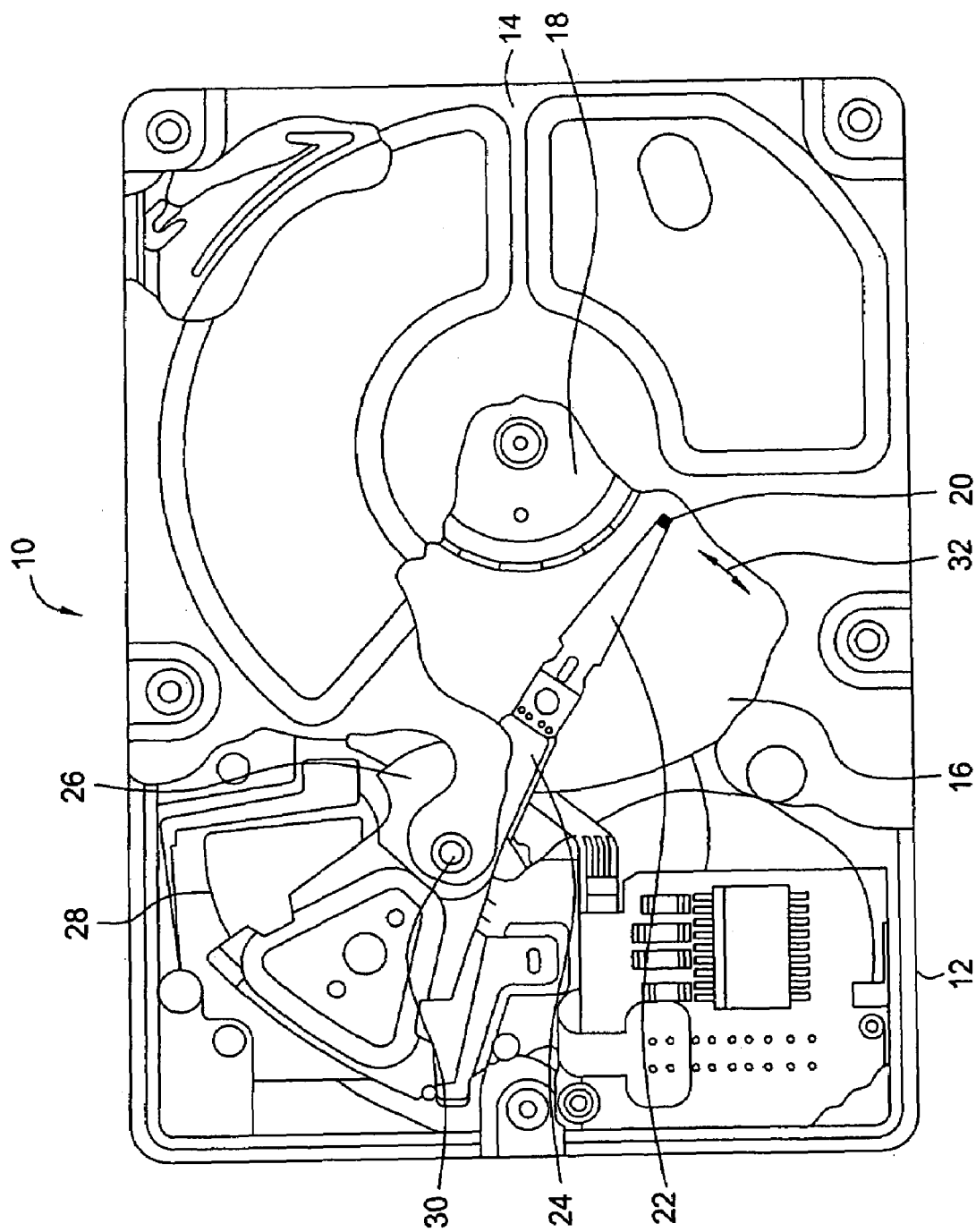
FIG. 1 depicts a plan view of one embodiment of a disk drive for use with aspects of the invention.

FIG. 1 depicts a plan view of one embodiment of a disk drive 10 for use with embodiments of the invention. Referring to FIG. 1, the disk drive 10 includes a housing base 12 and a top cover 14. The housing base 12 is combined with top cover 14 to form a sealed environment to protect the internal components from contamination by elements outside the sealed environment. The base and top cover arrangement shown in FIG. 1 is well known in the industry; however, other arrangements of the housing components have frequently been used, and aspects of the invention are not limited by the particular configuration of the disk drive housing. For example, disk drives have been manufactured using a vertical split between two housing members. In such drives, that portion of the housing half which connects to the lower end of the spindle motor is analogous to base 12, while the opposite side of the same housing member (which is connected or adjacent to the top of the spindle motor) is functionally the same as top cover 14. Disk drive 10 further includes a disk pack 16 that is mounted on a hub 202 (see FIG. 2) for rotation on a spindle motor (not shown) by a disk clamp 18. Disk pack 16 includes one or more of individual disks that are mounted for co-rotation about a central axis. Each disk surface has an associated read/write head 20 that is mounted to the disk drive 10 for communicating with the disk surface. In the example shown in FIG. 1, read/write heads 20 are supported by flexures 22 that are in turn attached to head mounting arms 24 of an actuator 26. The actuator shown in FIG. 1 is of the type known as a rotary moving coil actuator and includes a voice coil motor (VCM), shown generally at 28. Voice coil motor 28 rotates actuator 26 with its attached read/write heads 20 about a pivot shaft 30 to position read/write heads 20 over a desired data track along a path 32.

Figure 2:
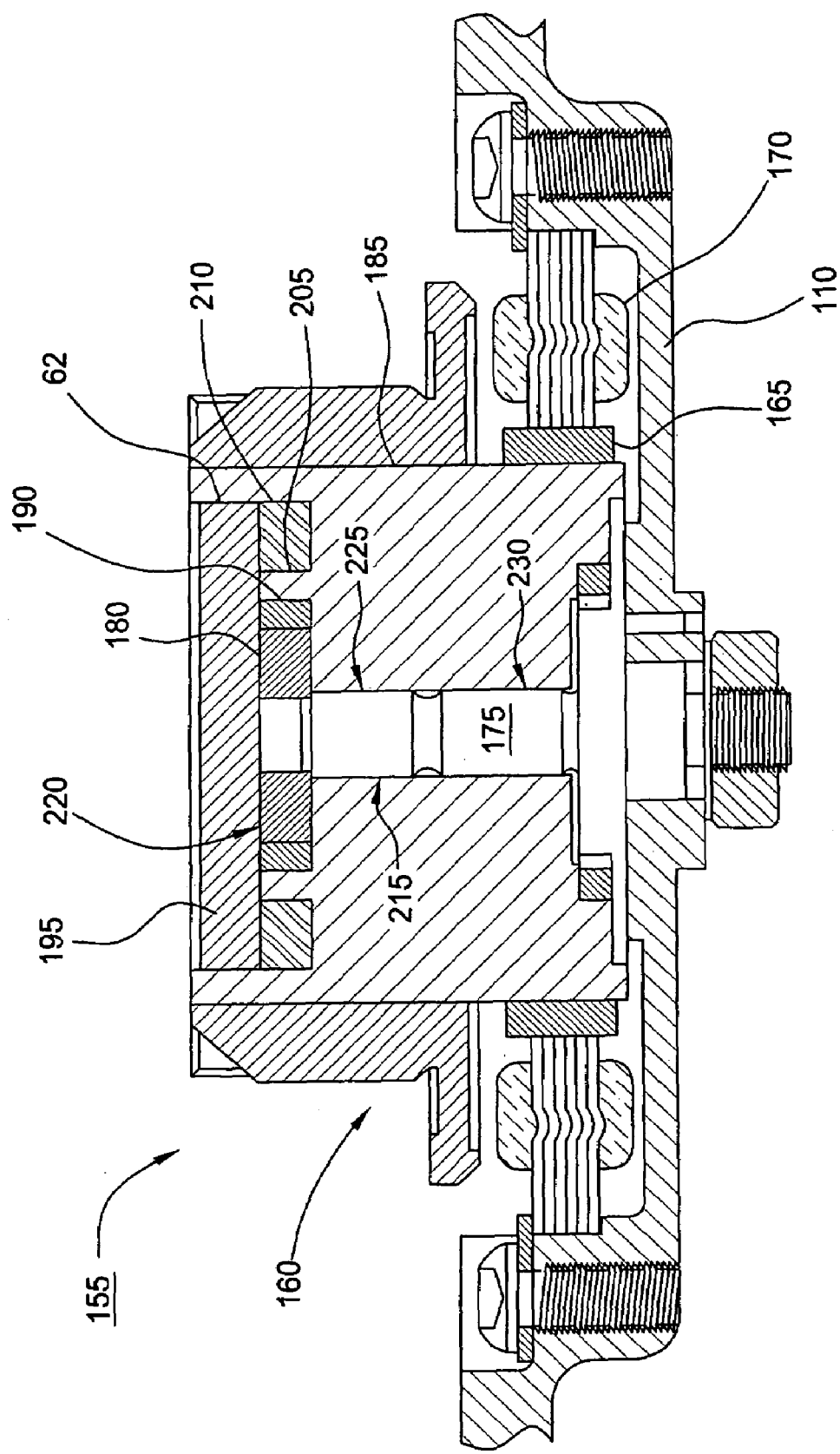
FIG. 2 is a vertical sectional view depicting one embodiment of a hydrodynamic bearing utilized in the disk drive of FIG. 1, for use with aspects of the invention.

FIG. 2 is a sectional side view of a spindle motor 155 of a type which is especially useful in disk drives 10. Typically the spindle motor 155 includes a rotatable hub 160 having one or more magnets 165 attached to a periphery thereof. The magnets 165 interact with a stator winding 170 attached to the base 110 to cause the hub 160 to rotate. The hub 160 is supported on a shaft 175 having a thrustplate 180 on one end. The thrustplate 180 can be an integral part of the shaft 175, or it can be a separate piece that is attached to the shaft, for example, by a press fit. The shaft 175 and the thrustplate 180 fit into a sleeve 185 and a thrustplate cavity 190 in the hub 160. A counter plate 195 may be provided above the thrustplate 180 resting on an annular ring 205 that extends from the hub 160. An O-ring 210 seals the counter plate 195 to the hub 160.

A fluid, such as a lubricating oil or a ferromagnetic fluid fills interfacial regions between the shaft 175 and the sleeve 185, and between the thrustplate 180 and the thrustplate cavity 190 and the counter plate 195. One or more of the thrustplate 180, the thrustplate cavity 190, the shaft 175, the sleeve 185, or the counter plate 195 has pressure-generating grooves (not shown in this figure) formed in accordance with the present invention to create hydrodynamic bearings 225. Preferably, grooves are formed in an outer surface 215 of the shaft or an inner surface 230 of the sleeve 185. More preferably, the grooves form one or more hydrodynamic journal bearings 225 having dynamic cushions that rotatably support the hub 160 in a radial direction.

Figure 3:
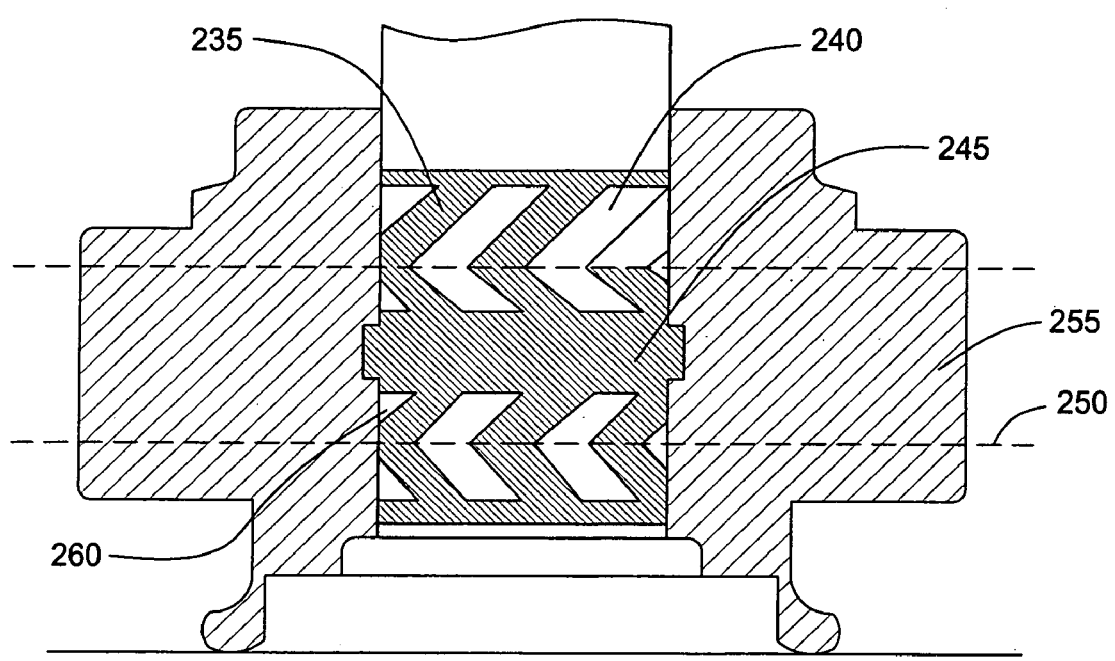
FIG. 3 depicts one embodiment of a work piece featuring hydrodynamic grooves, according to aspects of the invention.

The pressure generating grooves 235 formed on the inner surface 230 of the sleeve 185 will now be described with reference to FIG. 3. FIG. 3 depicts a sleeve 185 featuring hydrodynamic grooves 235 formed thereon. Hydrodynamic bearings, as previously mentioned, are generally formed between a rotatable member (i.e. sleeve 185) and a non-rotatable member (i.e. a shaft) having juxtaposed surfaces between which a layer or film of fluid is induced to form a dynamic cushion as an anti-friction medium. To form the dynamic cushion, at least one of the surfaces—here, the sleeve 185—is provided with grooves 235 which induce fluid flow in the interfacial region 260 and generate the localized region of dynamic high pressure referred to previously.

The grooves 235, which are separated by lands or raised regions 240, can have a depth of from about 0.009 to 0.015 mm. In one embodiment of hydrodynamic grooves, the grooves 235 are shaped and arranged to form a chevron or herringbone pattern. That is, the grooves 235 are made up of two straight segments, which meet at an angle to define a V shape as shown in FIG. 3. To form a hydrodynamic journal bearing 225, the grooves 235 are configured in a ring about the inner surface 230 of the sleeve 185. In one embodiment, the sleeve 185 has an inner diameter of slightly more than 3 mm, and chevron patterned grooves are formed on the surface thereof. Typically, hydrodynamic bearings 225 formed on a sleeve 185 in such a way also comprise one or more "relief cuts" 245 that circumscribe the inner surface 230 of the sleeve 185 and separate individual sets of grooves 235. Relief cuts 245 connect to grooves 235 and are formed at substantially the same depth (for example, 5 to 10 microns) on the sleeve surface. Furthermore, relief cuts 245 have a typical width of 1 mm. These relief cuts 245 have the effect of increasing the running gap of the hydrodynamic bearings 225 in certain areas, hence reducing friction loss by caused by unnecessary shearing of fluid. This is a way of reducing motor power consumption as well.

In current motor designs, relief cuts 245 are machined into the sleeve 185 simultaneously with the final cutting operation, i.e. in a separate process from the machining of grooves 235. This additional step in the machining process increases the time and cost expended by the complete machining process. In addition, such a process can create problems with the locations and tolerances of the boundaries between the relief cuts 245 and the active grooves 235. The tolerances of both the relief cut 245 boundaries and the groove 235 apexes 250 are based on the same component datums. Therefore, if the tolerances of both were at their extremes, the functionality of the bearings 225 could be compromised. The present invention not only provides a way to machine a hydrodynamic bearing 225 in a more timely and cost effective manner, but it also results in reduced motor power consumption and increased bearing reliability by improving the process in which the grooves 235 and relief cuts 245 are formed.

Figure 4:
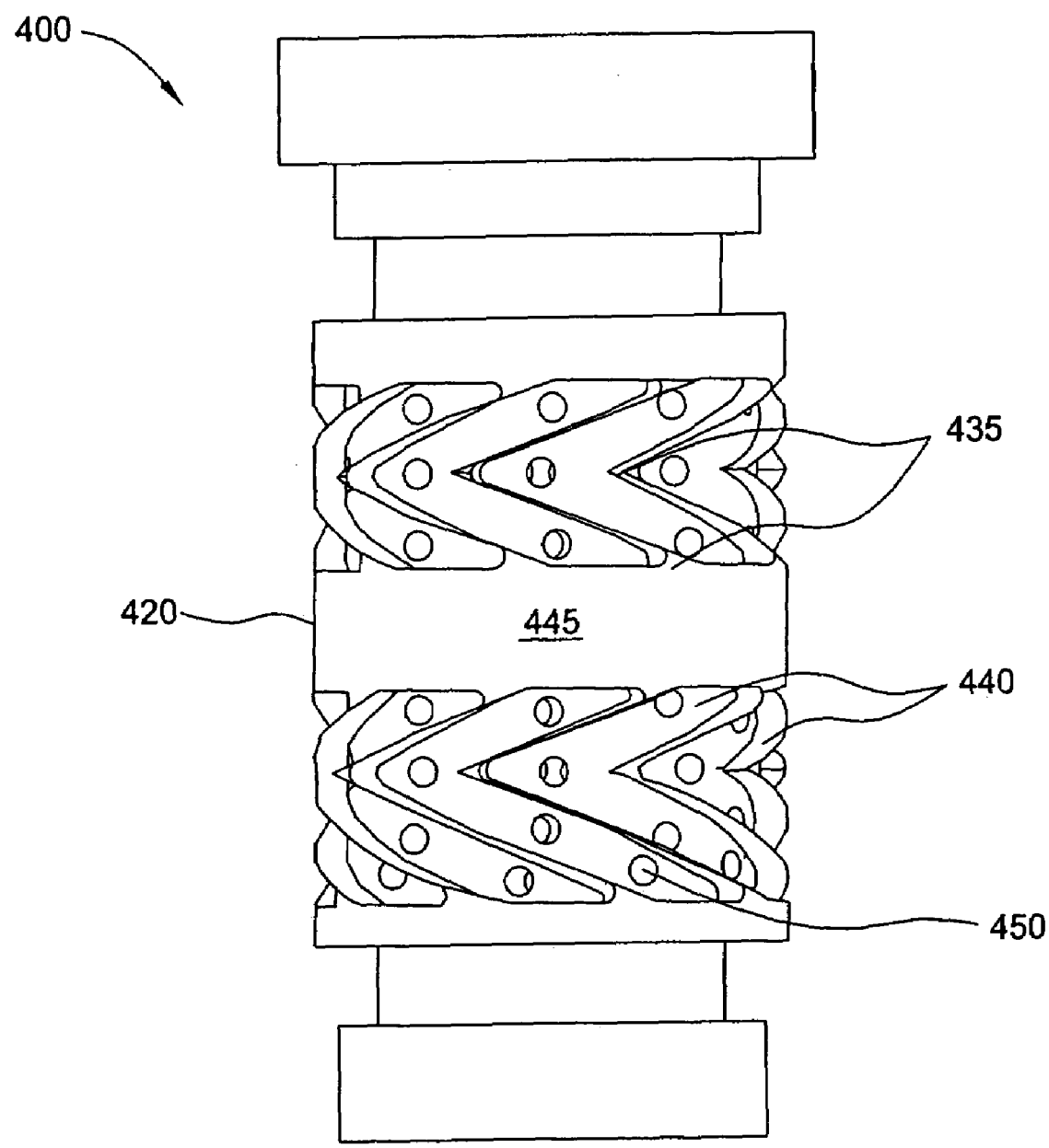
FIG. 4 depicts one embodiment of a hydrodynamic groove forming apparatus, according to aspects of the invention.
Figure 5:
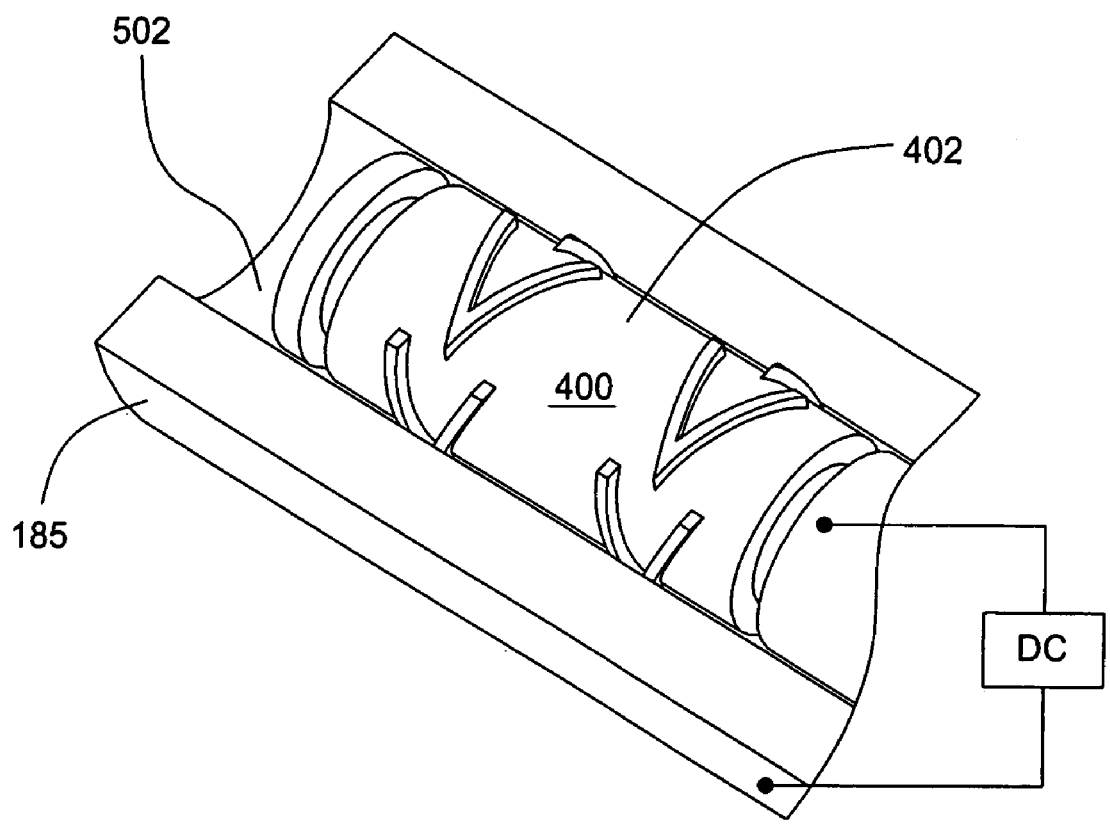
FIG. 5 is a cross sectional view of a groove forming apparatus and a work piece, according to aspects of the present invention.

FIG. 4 is an illustration of one embodiment of a hydrodynamic groove forming apparatus 400 for use in the electrochemical machining of hydrodynamic grooves 235. FIG. 5 may be referenced as needed in the discussion of FIG. 4 to facilitate an understanding of how the groove forming apparatus 400 functions. Groove forming apparatus 400 is used to form hydrodynamic grooves 235 on the inner surface of a work piece, for example, the sleeve 185 (shown in FIG. 3). The surface 420 of the apparatus 400 carries the pattern 435 of the hydrodynamic grooves 235 to be formed on the sleeve 185. Additionally, the apparatus 400 also carries the pattern 445 of the relief cut 245 to be formed on the sleeve 185 simultaneously with the formation of hydrodynamic grooves 235. The surfaces of groove pattern 435 and the relief cut pattern 445—which are the "active" surfaces of the apparatus 400—are at substantially equal elevations on the apparatus 400, so that the grooves 235 and relief cuts 245 formed on the sleeve 185 are coplanar. Finally, the apparatus 400 features land patterns 440 that are at a raised elevation relative to that of the groove pattern 435 and the relief cut pattern 445. These land patterns 440 further comprise an insulative material. The insulative material is retained by holes 450. Therefore, the land patterns 440 on the apparatus 400 may be considered the "inactive" portions of the apparatus 400 because current will not flow through the electrolyte from these regions.

The apparatus 400 is placed concentrically within the sleeve 185 in a substantially spaced-apart relation (shown in FIG. 5). That is, there is substantially no contact between the outer surface 402 of the apparatus 400 and the inner surface 230 of the sleeve 185. The apparatus 400 acts as a cathode and the sleeve 185 functions as an anode, with direct current being passed between the two surfaces through a conductive electrolyte (502 in FIG. 5), such as sodium nitrate. The current passed through the electrolyte 502 typically falls in the range of 8 to 10 amps. At the sleeve 185 surface, electrons are removed by current flow, except for at those portions of the shaft surface that face the insulated (inactive), land portions of the apparatus 400. As the metallic bonds of the molecular structure at the surface of the sleeve 185 are broken, material is removed from the inner surface 230 of the sleeve 185, creating the hydrodynamic grooves 235 and the relief cuts 245.

Essentially, the groove forming apparatus 400 allows for the consumption, during electrochemical machining, of the inner surface 230 of the sleeve 185. That is, material is removed from all portions of the inner sleeve surface facing active (i.e. groove 435 and relief cut 445) surfaces of the apparatus 400, and only the lands 240 remain on the original inner surface 230. Therefore, instead of actively cutting hydrodynamic grooves 235 and then relief cuts 245 into the sleeve 185 (as prior methods dictate), the grooves 235 and relief cuts 245 are formed simultaneously by etching everything but the lands 240. This is significant for two reasons. First, the relief cut 245 boundaries and the groove 235 apexes 250 are locked onto the apparatus 400 and so will always be in the same location relative to each other. This will lead to increased bearing 225 reliability as well as decreased component cost. Second, making the inner surface 230 of the sleeve 185 smooth-cut (i.e. no machined-in relief cuts) aids in the metrology of the inner surface 230 size and form tolerances. Thus, electrochemical machining with the groove forming apparatus 400 results not only in time and cost savings in the machining process, but also ultimately will lead to reduced power consumption by the hydrodynamic bearings so formed. For instance, in a current motor sample, the power consumed by the bearings can be reduced by approximately 46 mW by performing the inventive process described herein.

It is important to note that this invention is not limited to forming any specific bearing groove pattern, be it sinusoidal, straight line or other. Therefore, the present invention represents a significant time, cost, and power saving advancement in the field of electrochemical machining of hydrodynamic bearings. Furthermore, it produces bearings that function more reliably than those previously machined.

While the foregoing is directed to embodiments of the invention, other and further embodiments of the invention may be devised without departing from the basic scope thereof, and the scope thereof is determined by the claims that follow.

What is claimed is:

1. A method of forming a hydrodynamic bearing surface upon a workpiece, comprising:
removing, via electrochemical etching, all material in a region of the surface, except for portions of the region defined by a land pattern on a tool functioning as a cathode in the etching, wherein the removing forms a continuous recessed region comprising grooves formed between the portions of the region defined by the land pattern, and a relief cut region circumscribing the workpiece.

2. The method according to claim 1, further comprising:
positioning the tool within the workpiece;
insulating portions of the tool;
supplying an electrolyte between the tool and the workpiece; and
running a direct electric current between the workpiece and the tool.

3. The method according to claim 1, wherein the land pattern comprises an insulator.

4. The method according to claim 3, wherein the insulator is retained by holes on the tool.

5. The method according to claim 4, wherein the workpiece and the tool are positioned in a substantially spaced-apart relation and the surface of the workpiece faces an outer surface of the tool on which is disposed the land pattern.

6. The method according to claim 5, wherein a conductive electrolyte flows between the surface of the work-piece and the outer surface of the tool.

7. The method according to claim 6, wherein the grooves and the relief cut are formed at substantially the same depth in the work piece surface.

8. A method according to claim 1, wherein the workpiece is cylindrical and includes a first end, a second end, and a cylindrical surface as the surface, and the region is a portion of the cylindrical surface spaced apart from the first end and the second end.

9. A method according to claim 8, wherein the land pattern comprises two land pattern regions spaced apart on the cylindrical surface, each land pattern region circumscribing the cylindrical surface, and the relief cut is defined in a portion of the cylindrical surface between the two land pattern regions.

* * * * *